(12) United States Patent
Colgate et al.

(10) Patent No.: US 10,007,341 B2
(45) Date of Patent: Jun. 26, 2018

(54) TOUCH INTERFACE DEVICE AND METHOD FOR APPLYING LATERAL FORCES ON A HUMAN APPENDAGE

(75) Inventors: J. Edward Colgate, Evanston, IL (US); Michael A. Peshkin, Evanston, IL (US); Xiaowei Dai, Beijing (CN); John Ware, Brookline, MA (US); Nicholas Marchuk, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days. days.

(21) Appl. No.: 13/528,024

(22) Filed: Jun. 20, 2012

(65) Prior Publication Data

US 2012/0326999 A1 Dec. 27, 2012

Related U.S. Application Data

(60) Provisional application No. 61/499,221, filed on Jun. 21, 2011.

(51) Int. Cl.
| | |
|---|---|
| *G06F 3/045* | (2006.01) |
| *G06F 3/01* | (2006.01) |
| *G06F 1/16* | (2006.01) |
| *G06F 3/041* | (2006.01) |

(52) U.S. Cl.
CPC ............ *G06F 3/016* (2013.01); *G06F 1/1643* (2013.01); *G06F 3/041* (2013.01)

(58) Field of Classification Search
CPC .... G06F 3/016; G06F 3/041; G06F 2203/014; G06F 3/0414; G06F 1/1643; H01L 41/0926
USPC ........................................................ 345/173
See application file for complete search history.

(56) References Cited

U.S. PATENT DOCUMENTS

| | | | |
|---|---|---|---|
| 4,686,407 A | 8/1987 | Ceperley | |
| 5,184,319 A | 2/1993 | Kramer | |
| 5,561,337 A | 10/1996 | Toda | |
| 5,587,937 A | 12/1996 | Massie et al. | |
| (Continued) | | | |

FOREIGN PATENT DOCUMENTS

| | | |
|---|---|---|
| JP | 2001-255993 | 9/2001 |
| JP | 2006-163206 | 6/2006 |
| JP | 2008-287402 | 11/2008 |
| WO | WO 2010/105001 | 9/2010 |
| WO | WO2010/105006 A1 | 9/2010 |
| WO | WO 2010/139171 | 12/2010 |

OTHER PUBLICATIONS

ISR and W/O for PCT/US2012/043281 dated Jan. 22, 2013.
(Continued)

*Primary Examiner* — Michael J Jansen, II
(74) *Attorney, Agent, or Firm* — Vedder Price P.C.

(57) ABSTRACT

A touch interface device includes a touch surface configured to be engaged by an object, first and second actuator assemblies operably connected to the touch surface, and a controller operably connected with the first and second actuator assemblies. The first actuator assembly displaces the touch surface in one or more lateral directions along the touch surface at a first frequency. The second actuator assembly displaces the touch surface in an angled direction that is one of at least obliquely or perpendicularly angled to the touch surface at a second frequency. The controller operates the first and second actuator assemblies so that the touch surface varies in engagement with the object to impart a force on the object that is along the touch surface.

24 Claims, 4 Drawing Sheets

(56) References Cited

U.S. PATENT DOCUMENTS

| | | | |
|---|---|---|---|
| 5,631,861 A | 5/1997 | Kramer | |
| 5,709,219 A | 1/1998 | Chen et al. | |
| 5,760,530 A | 6/1998 | Kolesar | |
| 6,059,506 A | 5/2000 | Kramer | |
| 6,429,846 B2 | 8/2002 | Rosenberg et al. | |
| 6,570,299 B2 | 5/2003 | Takeshima et al. | |
| 6,693,516 B1 | 2/2004 | Hayward | |
| 6,970,160 B2 | 11/2005 | Mulligan et al. | |
| 6,979,164 B2 | 12/2005 | Kramer | |
| 7,148,875 B2 | 12/2006 | Rosenberg et al. | |
| 7,271,707 B2 | 9/2007 | Gonzales | |
| 7,292,227 B2* | 11/2007 | Fukumoto | G01C 21/3664 178/18.04 |
| 7,390,157 B2 | 6/2008 | Kramer | |
| 7,701,445 B2 | 4/2010 | Inokawa et al. | |
| 7,714,701 B2 | 5/2010 | Altan et al. | |
| 7,742,036 B2 | 6/2010 | Grant et al. | |
| 7,825,903 B2 | 11/2010 | Anastas et al. | |
| 7,952,498 B2 | 5/2011 | Higa | |
| 7,986,303 B2* | 7/2011 | Braun | A63F 13/06 345/163 |
| 8,169,402 B2* | 5/2012 | Shahoian | G06F 3/016 345/156 |
| 8,253,306 B2 | 8/2012 | Morishima et al. | |
| 8,253,703 B2* | 8/2012 | Eldering | G06F 3/016 340/407.2 |
| 8,279,193 B1* | 10/2012 | Birnbaum | G06F 3/016 340/407.2 |
| 8,325,144 B1* | 12/2012 | Tierling | G06F 3/016 345/156 |
| 8,362,882 B2* | 1/2013 | Heubel | G06F 1/163 340/407.1 |
| 8,405,618 B2* | 3/2013 | Colgate | G06F 3/016 345/173 |
| 8,436,825 B2* | 5/2013 | Coni | G06F 3/041 178/18.01 |
| 8,493,354 B1* | 7/2013 | Birnbaum | G06F 3/016 340/407.2 |
| 8,525,778 B2* | 9/2013 | Colgate et al. | 345/156 |
| 8,570,296 B2* | 10/2013 | Birnbaum | G06F 3/016 340/407.2 |
| 8,581,873 B2* | 11/2013 | Eldering | G06F 3/016 345/173 |
| 8,624,864 B2* | 1/2014 | Birnbaum | G06F 3/016 340/407.2 |
| 8,659,571 B2* | 2/2014 | Birnbaum | G06F 3/016 340/407.2 |
| 8,711,118 B2* | 4/2014 | Short | G06F 3/016 340/407.2 |
| 8,754,757 B1* | 6/2014 | Ullrich | G06F 3/016 340/407.1 |
| 8,754,758 B1* | 6/2014 | Ullrich | G06F 3/016 340/407.1 |
| 8,780,053 B2* | 7/2014 | Colgate | G06F 3/016 178/18.04 |
| 8,823,674 B2* | 9/2014 | Birnbaum | G06F 3/016 340/407.2 |
| 8,836,664 B2* | 9/2014 | Colgate | G06F 3/016 345/173 |
| 8,847,741 B2* | 9/2014 | Birnbaum | G06F 3/016 340/407.1 |
| 8,866,601 B2* | 10/2014 | Cruz-Hernandez | G08B 6/00 340/4.12 |
| 8,866,788 B1* | 10/2014 | Birnbaum | G06F 3/016 340/407.2 |
| 8,981,915 B2* | 3/2015 | Birnbaum | G06F 3/016 340/407.1 |
| 9,041,662 B2* | 5/2015 | Harris | G06F 3/016 178/18.04 |
| 9,104,285 B2* | 8/2015 | Colgate | G06F 3/016 |
| 9,110,507 B2* | 8/2015 | Radivojevic | G06F 3/016 |
| 9,122,325 B2* | 9/2015 | Peshkin | G06F 3/016 |
| 9,122,330 B2* | 9/2015 | Bau | G06F 3/016 |
| 9,261,963 B2* | 2/2016 | Jiang | G06F 3/016 |
| 2001/0026266 A1 | 10/2001 | Schena et al. | |
| 2001/0043847 A1 | 11/2001 | Kramer | |
| 2003/0038776 A1 | 2/2003 | Rosenberg et al. | |
| 2004/0237669 A1 | 12/2004 | Hayward et al. | |
| 2005/0017947 A1 | 1/2005 | Shahoian et al. | |
| 2005/0030284 A1 | 2/2005 | Braun et al. | |
| 2005/0030292 A1 | 2/2005 | Diederiks | |
| 2005/0057527 A1 | 3/2005 | Takenaka et al. | |
| 2005/0057528 A1* | 3/2005 | Kleen | G06F 3/016 345/173 |
| 2005/0173231 A1 | 8/2005 | Gonzales | |
| 2006/0097996 A1 | 5/2006 | Tabata | |
| 2006/0115348 A1 | 6/2006 | Kramer | |
| 2006/0119573 A1* | 6/2006 | Grant | B06B 1/0215 345/156 |
| 2006/0187197 A1* | 8/2006 | Peshkin | G06F 3/016 345/156 |
| 2006/0209037 A1 | 9/2006 | Wang et al. | |
| 2006/0244732 A1 | 11/2006 | Geaghan | |
| 2006/0279548 A1 | 12/2006 | Geaghan | |
| 2007/0146317 A1 | 6/2007 | Schena | |
| 2007/0236450 A1* | 10/2007 | Colgate et al. | 345/156 |
| 2007/0236474 A1 | 10/2007 | Ramstein | |
| 2008/0007517 A9* | 1/2008 | Peshkin | G06F 3/016 345/156 |
| 2008/0048974 A1* | 2/2008 | Braun et al. | 345/156 |
| 2008/0055244 A1* | 3/2008 | Cruz-Hernandez | G06F 3/016 345/157 |
| 2008/0060856 A1 | 3/2008 | Shahoian et al. | |
| 2008/0062122 A1* | 3/2008 | Rosenberg et al. | 345/156 |
| 2008/0062143 A1* | 3/2008 | Shahoian | G06F 1/1616 345/173 |
| 2008/0062144 A1 | 3/2008 | Shahoian | |
| 2008/0062145 A1 | 3/2008 | Shahoian et al. | |
| 2008/0068351 A1 | 3/2008 | Rosenberg et al. | |
| 2008/0111447 A1 | 5/2008 | Matsuki | |
| 2008/0129705 A1 | 6/2008 | Kim et al. | |
| 2008/0170037 A1 | 7/2008 | Cruz-Hernandez et al. | |
| 2009/0002328 A1* | 1/2009 | Ullrich | G06F 3/016 345/173 |
| 2009/0036212 A1 | 2/2009 | Provancher | |
| 2009/0079550 A1 | 3/2009 | Makinen et al. | |
| 2009/0085882 A1* | 4/2009 | Grant | G06F 1/1626 345/173 |
| 2009/0115734 A1* | 5/2009 | Fredriksson | G06F 3/016 345/173 |
| 2009/0189873 A1 | 7/2009 | Peterson et al. | |
| 2009/0225046 A1* | 9/2009 | Kim | G06F 3/016 345/173 |
| 2009/0231113 A1 | 9/2009 | Olien et al. | |
| 2009/0284485 A1* | 11/2009 | Colgate et al. | 345/173 |
| 2009/0290732 A1 | 11/2009 | Berriman et al. | |
| 2010/0108408 A1* | 5/2010 | Colgate et al. | 178/18.03 |
| 2010/0109486 A1 | 5/2010 | Polyakov et al. | |
| 2010/0141407 A1* | 6/2010 | Heubel | G06F 1/163 340/407.1 |
| 2010/0149111 A1 | 6/2010 | Olien | |
| 2010/0156818 A1 | 6/2010 | Burrough et al. | |
| 2010/0177050 A1* | 7/2010 | Heubel | G06F 3/016 345/173 |
| 2010/0207895 A1* | 8/2010 | Joung | G06F 3/016 345/173 |
| 2010/0225596 A1* | 9/2010 | Eldering | G06F 3/016 345/173 |
| 2010/0231367 A1* | 9/2010 | Cruz-Hernandez et al. | 340/407.2 |
| 2010/0231508 A1* | 9/2010 | Cruz-Hernandez | G06F 3/016 345/156 |
| 2010/0231539 A1* | 9/2010 | Cruz-Hernandez | G06F 3/016 345/173 |
| 2010/0231540 A1* | 9/2010 | Cruz-Hernandez | G06F 3/016 345/173 |
| 2010/0231541 A1* | 9/2010 | Cruz-Hernandez | G06F 3/016 345/173 |
| 2010/0231550 A1* | 9/2010 | Cruz-Hernandez et al. | 345/174 |

(56) References Cited

U.S. PATENT DOCUMENTS

| | | | |
|---|---|---|---|
| 2010/0312366 A1* | 12/2010 | Madonna | H05B 37/0245 700/90 |
| 2011/0009195 A1* | 1/2011 | Porwal | A63F 13/22 463/37 |
| 2011/0012717 A1 | 1/2011 | Pance et al. | |
| 2011/0043477 A1 | 2/2011 | Park et al. | |
| 2011/0090167 A1* | 4/2011 | Harris | G06F 3/016 345/173 |
| 2011/0115754 A1* | 5/2011 | Cruz-Hernandez | G05G 1/08 345/184 |
| 2011/0128239 A1 | 6/2011 | Polyakov et al. | |
| 2011/0141052 A1* | 6/2011 | Bernstein | G06F 3/016 345/174 |
| 2011/0157088 A1* | 6/2011 | Motomura | G06F 3/014 345/174 |
| 2011/0187658 A1* | 8/2011 | Song et al. | 345/173 |
| 2011/0193824 A1* | 8/2011 | Modarres | G06F 3/016 345/177 |
| 2011/0215914 A1 | 9/2011 | Edwards | |
| 2011/0260988 A1* | 10/2011 | Colgate | G06F 3/016 345/173 |
| 2011/0285637 A1* | 11/2011 | Karkkainen | G06F 3/016 345/173 |
| 2011/0285666 A1* | 11/2011 | Poupyrev | G06F 3/016 345/174 |
| 2011/0285667 A1* | 11/2011 | Poupyrev | G06F 3/016 345/174 |
| 2011/0316798 A1* | 12/2011 | Jackson | G06F 3/016 345/173 |
| 2012/0028577 A1* | 2/2012 | Rodriguez | H04N 21/44008 455/41.1 |
| 2012/0038568 A1 | 2/2012 | Colloms et al. | |
| 2012/0062516 A1 | 3/2012 | Chen et al. | |
| 2012/0075210 A1* | 3/2012 | Coni et al. | 345/173 |
| 2012/0126959 A1 | 5/2012 | Zarrabi et al. | |
| 2012/0206248 A1 | 8/2012 | Biggs | |
| 2012/0206371 A1 | 8/2012 | Turunen et al. | |
| 2012/0217982 A1* | 8/2012 | Narayanasamy | H03K 17/962 324/686 |
| 2012/0223880 A1* | 9/2012 | Birnbaum | G06F 3/015 345/156 |
| 2012/0229400 A1* | 9/2012 | Birnbaum | G06F 3/016 345/173 |
| 2012/0229401 A1* | 9/2012 | Birnbaum | G06F 3/016 345/173 |
| 2012/0268386 A1 | 10/2012 | Karamath et al. | |
| 2012/0268412 A1* | 10/2012 | Cruz-Hernandez | G06F 3/0488 345/174 |
| 2012/0286847 A1* | 11/2012 | Peshkin | G06F 3/016 327/517 |
| 2012/0287068 A1* | 11/2012 | Colgate | G06F 3/016 345/173 |
| 2012/0293441 A1* | 11/2012 | Eldering | G06F 3/016 345/173 |
| 2012/0326999 A1* | 12/2012 | Colgate | G06F 3/016 345/173 |
| 2012/0327006 A1* | 12/2012 | Israr | G06F 3/016 345/173 |
| 2013/0044049 A1 | 2/2013 | Biggs et al. | |
| 2013/0106774 A1* | 5/2013 | Radivojevic | G06F 3/044 345/174 |
| 2013/0207904 A1* | 8/2013 | Short | G06F 3/016 345/173 |
| 2013/0207917 A1* | 8/2013 | Cruz-Hernandez | G06F 3/016 345/173 |
| 2013/0222303 A1* | 8/2013 | Colgate | G06F 3/016 345/173 |
| 2013/0222310 A1* | 8/2013 | Birnbaum | G06F 3/016 345/173 |
| 2013/0300683 A1* | 11/2013 | Birnbaum | G06F 3/016 345/173 |
| 2014/0071079 A1* | 3/2014 | Heubel | G06F 3/041 345/173 |
| 2014/0092055 A1* | 4/2014 | Radivojevic | G06F 3/016 345/174 |
| 2014/0101545 A1* | 4/2014 | Paek | G06F 3/016 715/702 |
| 2014/0104165 A1* | 4/2014 | Birnbaum | G06F 3/016 345/156 |
| 2014/0118125 A1* | 5/2014 | Bhatia | G06F 3/016 340/407.1 |
| 2014/0139327 A1* | 5/2014 | Bau | G06F 3/016 340/407.1 |
| 2014/0139448 A1* | 5/2014 | Levesque | G06F 3/041 345/173 |
| 2014/0139450 A1* | 5/2014 | Levesque | G08B 6/00 345/173 |
| 2014/0139451 A1* | 5/2014 | Levesque | G06F 3/016 345/173 |
| 2014/0139452 A1* | 5/2014 | Levesque | G06F 3/0414 345/173 |
| 2014/0184497 A1* | 7/2014 | Birnbaum | G06F 3/016 345/156 |
| 2014/0198130 A1* | 7/2014 | Lacroix | G06F 3/011 345/633 |
| 2014/0218185 A1* | 8/2014 | Cruz-Hernandez | G06F 3/016 340/407.1 |
| 2014/0247227 A1* | 9/2014 | Jiang | G06F 3/016 345/173 |
| 2014/0247406 A1* | 9/2014 | Park | G06F 3/041 349/12 |
| 2014/0320431 A1* | 10/2014 | Cruz-Hernandez | G06F 3/041 345/173 |
| 2014/0333565 A1* | 11/2014 | Birnbaum | G06F 3/016 345/173 |
| 2014/0342709 A1* | 11/2014 | Stepanian | G06F 21/10 455/414.1 |
| 2014/0347270 A1* | 11/2014 | Birnbaum | G06F 3/016 345/156 |
| 2014/0347323 A1* | 11/2014 | Colgate | G06F 3/016 345/174 |
| 2015/0009168 A1* | 1/2015 | Levesque | H04M 19/04 345/174 |
| 2015/0035780 A1* | 2/2015 | Birnbaum | G06F 3/016 345/173 |
| 2015/0054773 A1* | 2/2015 | Jiang | G06F 3/016 345/174 |
| 2015/0070146 A1* | 3/2015 | Cruz-Hernandez | G06F 3/016 340/407.1 |
| 2015/0145657 A1* | 5/2015 | Levesque | G06F 3/016 340/407.2 |
| 2015/0160771 A1* | 6/2015 | Takeuchi | G06F 3/0414 345/177 |
| 2015/0160772 A1* | 6/2015 | Takeuchi | G06F 3/0414 345/177 |
| 2015/0185848 A1* | 7/2015 | Levesque | G06F 3/016 345/173 |
| 2015/0185849 A1* | 7/2015 | Levesque | G06F 3/016 340/636.1 |
| 2015/0189223 A1* | 7/2015 | Levesque | H04N 5/9305 386/227 |
| 2015/0301673 A1* | 10/2015 | Peshkin | G06F 3/016 345/174 |
| 2015/0355710 A1* | 12/2015 | Modarres | G09G 5/003 345/173 |
| 2015/0363365 A1* | 12/2015 | Campbell | G06F 3/0412 345/173 |

OTHER PUBLICATIONS

Reznik et al.; "A Flat Rigid Plate is a Universal Planar Manipulator"; In *IEEE International Conference on Robotics and Automation*; May 1998; pp. 1471-1477.

Bau et al.; "TeslaTouch: Electrovibration for Touch Surfaces"; *User Interface Science and Technology* (UIST) 2010; Oct. 3-6; New York.

(56) References Cited

OTHER PUBLICATIONS

Grimnes; "Electrovibration, cutaneous sensation of microampere current"; *Acta. Physiol. Scand.;* Jan. 1983; pp. 19-25; vol. 118; No. 1.

Kaczmarek; "Electrotactile Display of Computer Graphics for Blind—Final Report"; National Eye Institute grant 5-R01-EY10019-08; Dec. 23, 2004.

Kaczmarek et al.; "Polarity Effect in Electrovibration for Tactile Display"; *IEEE Trans on Biomedical Engineering;* Oct. 2006; pp. 2047-2054; vol. 53; No. 10.

Strong et al.; "An Electrotactile Display"; *IEEE Tranactions on Man-Machine Systems;* Mar. 1970; pp. 72-79; vol. MMS-11; No. 1.

Biggs et al.; "Haptic Interfaces"; Published by Lawrence Erlbaum Associates; 2002; pp. 93-115; Chapter 5.

Minsky; "Computational Haptics: The *Sandpaper* System for Synthesizing Texture for a Force-Feedback Display"; PhD Thesis; Massachusetts Institute of Technology, Cambridge, MA; Jul. 6, 1995; pp. 1-217.

Robles-De-La-Torre; "Comparing the Role of Lateral Force During Active and Passive Touch: Lateral Force and its Correlates are Inherently Ambiguous Cues for Shape Perception under Passive Touch Conditions"; 2002; Proceedings of Eurohaptics 2002, University of Edinburgh, United Kingdom; 2002; pp. 159-164.

Robles-De-La-Torre et al.; "Force Can Overcome Object Geometry in the Perception of Shape Through Active Touch"; *Letters to Nature,* Jul. 2001; pp. 445-448; vol. 412.

Cerundolo; "Effect of Charge Migration in Electrostatic Tactile Displays"; MS Thesis, Dept of Mechanical Engineering, Northwestern University; Aug. 2010.

http://niremf.ifac.cnr.it/tissprop/htmlclie/htmlclie.htm; Sep. 20, 2012; pp. 1-3.

www.senseg.com; Sep. 20, 2012; pp. 1-2.

http://www.teslatouch.com/; Sep. 20, 2012; pp. 1-4.

Kaczmarek et al.; "Electrotactile and Vibrotactile Displays for Sensory Substitution Systems"; *IEEE Transactions on Biomedical Engineering;* Jan. 1991; pp. 1-16; vol. 38, No. 1.

Tang et al.; "A Microfabricated Electrostatic Haptic Display for Persons with Visual Impairments"; *IEEE Transactions on Rehabilitation Engineering;* Sep. 1998; pp. 241-248; vol. 6, No. 3.

Mallinckrodt et al.; "Perception by the Skin of Electrically InducedVibrations"; *Science;* Sep. 1953; pp. 277-278; vol. 118, No. 3062.

Yamamoto et al.; "Electrostatic Tactile Display for Presenting Surface Roughness Sensation"; in *Industrial Technology, 2003 IEEE International Conference;* Dec. 2003, pp. 680-684.

Takasaki et al.; "Transparent Surface Acoustic Wave Tactile Display," *International Conference on Intelligent Robots and Systems;* Aug. 2005, pp. 3354-3359.

Watanabe et al.; "A Method for Controlling Tactile Sensation of Surface Roughness Using Ultrasonic Vibration"; in *IEEE International Conference on Robotics and Automation;* May 1995; pp. 1134-1139; vol. 1.

Biet et al.; "Implementation of Tactile Teedback by Modifying the Perceived Friction"; *The European Physical Journal Applied Physics;* Jul. 2008; pp. 123-135; , vol. 43, No. 1.

Winfield et al; "T-PaD: Tactile Pattern Display through Variable Friction Reduction"; *World Haptics Conference;* 2007; pp. 421-426.

Wang et al.; "Haptic Overlay Device for Flat Panel Touch Displays"; *Proceedings of the 12$^{th}$ International Symposium on Haptic Interfaces for Virtual Environment and Teleoperator Systems;* 2004; pp. 1.

Chubb et al.; "ShiverPad: A Device Capable of Controlling Shear Force on a Bare Finger"; *Third Joint Eurohaptics Conference and Symposium on Haptic Interfaces for Virtual Environment and Teleoperator Systems;* Mar. 18-20, 2009; pp. 18-23.

Chubb et al.; "ShiverPaD: A Glass Haptic Surface that Produces Shear Force on a Bare Finger"; *Transactions on Hapics;* 2010; pp. 1-10; vol. X, No. X.

Kato et al.; "Sheet-Type Braille Displays by Integrating Organic Field-Effect Transistors and Polymeric Actuators"; *IEEE Transactions on Electron Devices;* Feb. 2007; pp. 202-209; vol. 54; No. 2.

Pasquero et al.; "STReSS: A Practical Tactile Display With One Millimeter Spatial Resolution and 700 Hz Refresh Rate," *Proc. of Eurohaptics 2003 Dublin, Ireland;* Jul. 2002; pp. 94-110.

Levesque et al.; "Experimental Evidence of Lateral Skin Strain During Tactile Exploration"; *CHI-2009—Clicking on Buttons;* Apr. 6, 2009; pp. 261-275.

Harrison et al.; "Providing Dynamically Changeable Physical Buttons on a Visual Display"; *Proc. of the 27th international conf. on Human factors in computing systems;* 2009; pp. 299-308.

Biet, Discrimination of Virtual Square Gratings by Dynamic Touch on Friction Based Tactile Displays, Symposium on Haptic Interfaces for Virtual Environments and Teleoperator Systems, pp. 41-48, 2008.

E.C. Chubb, "Shiverpad: A haptic surface capable of applying shear forces to bare finger," Master's thesis, Northwestern University, Evanston, IL, USA, 2009.

Minsky et al., Feeling and Seeing: Issues in Force Display, Symposium on Interactive 3D Graphics, Proceedings of 1990 Symposium, Snowbird, Utah, pp. 235-243, 270, 1990.

Takaaki et al., An application of saw to a tactile display in virtual reality, IEEE Ultrasonics Symposium, pp. 1-4, 2000.

Takaaki et al., Surface Acoustic Wave Tactile Display, IEEE Computer Graphics and Applications, pp. 55-63, Nov./Dec. 2001.

Takasaki et al., A surface acoustic wave tactile display with friction control, IEEE Computer Graphics and Applications, IEEE International Conference, pp. 240-243, 2001.

Wiesendanger et al., Squeeze film air bearings using piezoelectric bending elements, 5th Intl. Conference on Motion and Vibration Control, (MOVIC2000) pp. 181-186, 2000.

Winfield, A Virtual Texture Display using Ultrasonically Vibrating Plates, Paper [online], Nov. 2007, [retrieved on Dec. 4, 2010]. Http://vroot.org/node/4707.

European Search Report for EP Application No. 12 802 419.7 dated Mar. 20, 2015.

Goethals, Tactile Feedback for Robot Assisted Minimally Invasive Surgery: An Overview, paper [online], Jul. 2008.

\* cited by examiner

TOUCH INTERFACE DEVICE AND METHOD FOR APPLYING LATERAL FORCES ON A HUMAN APPENDAGE

RELATED APPLICATIONS

This application claims priority benefit to U.S. Provisional Application No. 61/499,221, entitled "Touch Interface Device And Method For Applying Lateral Forces On A Human Appendage," which was filed on Jun. 21, 2011 ("the '221 Application"). The entire subject matter of the '221 Application is incorporated by reference.

This application incorporates in its entirety the subject matter of U.S. patent application Ser. No. 13/468,695, entitled "A Touch Interface Device And Method For Applying Controllable Shear Forces To A Human Appendage," which was filed on May 10, 2012 ("the '695 Application").

This application incorporates in its entirety the subject matter of U.S. patent application Ser. No. 13/468,818, entitled "A Touch Interface Device Having An Electrostatic Multitouch Surface And Method For Controlling The Device," which was filed on May 10, 2012 ("the '818 Application").

STATEMENT REGARDING FEDERALLY SPONSORED RESEARCH OR DEVELOPMENT

This invention was made with government support under IIS0964075 awarded by the National Science Foundation. The government has certain rights in the invention.

BACKGROUND

Touch interface devices can include computing devices having touch sensitive surfaces used to receive input from operators of the devices. For example, many smart phones, tablet computers, and other devices have touch sensitive screens that identify touches from operators as input to the devices. Haptic or tactile feedback from such screens has emerged as a highly sought feature.

Effective mechanisms for producing such a physical sensation have been lacking. Some known mechanisms include vibrating the entire device, while in others the screen is tapped or "popped", or the screen is shimmied laterally. Interesting haptic effects can be produced, but the effects fall short of the kind of tactile sensations that one encounters in touching an actual textured surface, or a device that has physical buttons or ridges or other physical haptic features.

Buttons in particular are a high priority. In touching a real button, a user's fingers are sensitive to the edges of the button, so that the location of the button is evident and the user has confidence, without looking, of being properly registered or aligned to the button.

Touch is an "active sense," as it is fundamentally an interplay of the user's motion with the sensations received. Touch is seldom employed without motion. The sensation of touching a button or another feature—such as a ridge, bump, curve, etc—may benefit from several modes of touch, which are generally used in combination.

A first mode is due to the pattern of force indenting the surface of the fingertip. This can be thought of as a static phenomenon, as, in principle, one could perceive a pattern just by pressing a fingertip into contact with a surface. In practice the perception of a pattern is enhanced by sliding the fingertip across it, much as a reader of Braille slides a finger across a Braille character, rather than pressing a finger onto it.

An additional mode is the guiding of fingertip motion that an edge or pattern presents. This mode seems to require (not just be enhanced by) motion of the fingertip. A sensation of letting the surface guide the finger's motion is experienced. An example is following a ridge line, display edge, or the edge of a button that is large compared to the fingertip. Arrays of controls (buttons and switches) in vehicles present many such haptic features, to reduce reliance on vision. Other devices with which one wishes to become haptically familiar also tend to have strong haptic features, e.g. musical instruments.

Additionally, lateral forces may be perceived even when there is no ongoing finger motion at a given moment. For instance, a user may have pushed a finger up against a button edge or haptic feature, and left it in contact there, so that a lateral force continues to push back.

BRIEF DESCRIPTION

In accordance with one embodiment, a method for applying force from a surface to an object (such as a user's finger) is provided. The method includes moving the surface in one or more lateral directions of the surface, wherein the moving in one or more lateral directions is performed periodically at a frequency of at least about 1 kiloHertz. The method also includes periodically moving the surface in at least one angled direction that is at least one of obliquely or perpendicularly angled to the surface. The generally planar surface at least one of articulates into and out of contact with the object or varies in degree of engagement with the object. The method further includes controlling the moving in one or more lateral directions and moving in at least one angled direction to impart a force that is oriented along the surface, wherein the force is configured to provide a haptic output to an operator of a device that includes the surface.

In another embodiment, a touch interface device is provided. The touch interface device includes a touch surface configured to be engaged by an object. The touch interface also includes a first actuator assembly operably connected to the touch surface. The first actuator assembly is configured to displace the touch surface in one or more lateral directions along the touch surface at a first frequency that is at least about 1 kiloHertz. Further, the touch interface includes a second actuator assembly operably connected to the touch surface. The second actuator assembly is configured to displace the touch surface in an angled direction that is at least one of obliquely or perpendicularly angled to the touch surface at a second frequency, which may be close to or the same as the first frequency, and may vary in phase with respect the first frequency. The touch interface device also includes a controller operably connected with the first and second actuator assemblies. The controller is configured to operate the first and second actuator assemblies so that the touch surface varies in engagement with the object to impart a force on the object that is along the touch surface.

In another embodiment, a tangible and non-transitory computer readable storage medium for a system that includes a processor is provided. The computer readable storage medium includes one or more sets of instructions configured to direct the processor to control a first actuator assembly to move a touch surface in one or more lateral along the touch surface, wherein the first actuator assembly moves the generally planar surface in the one or more lateral directions periodically at a frequency of at least about 1 kiloHertz. The processor is also directed to control a second actuator assembly to move at least a portion of the generally planar surface in at one or more angled directions that are at least one of obliquely or substantially perpendicularly angled to the touch surface. The second actuator assembly moves the touch surface periodically. The processor is further directed to control motion in the one or more lateral directions and motion in one or more angled directions to impart a force on the object along the touch surface, wherein the force is configured to provide haptic output to an operator of a device that includes the touch surface.

BRIEF DESCRIPTION OF THE DRAWINGS

The subject matter described herein will be better understood from reading the following description of non-limiting embodiments, with reference to the attached drawings, wherein below.

DETAILED DESCRIPTION

Embodiments of the present inventive subject matter provide for improved performance in haptic or tactile sensations provided by, for example, a surface such as a touch screen. In embodiments, motion in at least one direction that is substantially co-planar with the screen is combined with motion in at least one of an oblique direction or a direction that is substantially perpendicular to the surface. The motions are synchronized or controlled to provide a sensation of lateral movement of the surface against an object, such as a finger or other appendage, positioned proximate to the screen.

For example, a vertical motion (substantially perpendicular to the screen, or, as another example, substantially perpendicular to a touch pad) may bring the screen into and out of contact with a finger, while the lateral motion of the surface is controlled so that the lateral motion is experienced in a chosen direction when the surface is at or near a vertical peak (with the surface contacting the finger), with movement in other lateral directions occurring when the surface is not in contact with the finger, and thus not experienced or sensed.

In other embodiments, the vertical or oblique movement may be such that the degree of engagement of the surface with an object, such as a finger is varied. For example, a lateral force in a desired direction may be imparted by controlling the motions such that the surface is moving in the desired lateral direction at or near a point of maximum engagement, while moving in another direction at a point of minimum engagement, whereby any motion may be imperceptible to a human at or near the point of minimum engagement.

Further, the motions may be periodic at a frequency substantially high enough so that the periodicity is substantially imperceptible to human detection. The frequency, for example, may be ultrasonic, so that the vibration is also not heard.

Thus, embodiments provide a net force in a selected direction or directions. Further, embodiments provide for the perception of a force that can be applied to a finger (or other object) that is stationary, or even moving in a similar direction as the force. In some embodiments sufficiently high frequency vibrations are employed to allow for vibrations that are not tactilely perceived by human touch and/or perceived by sound, so that the imparted force is experienced as a constantly perceived force during the duration of the movement.

Figure 1:
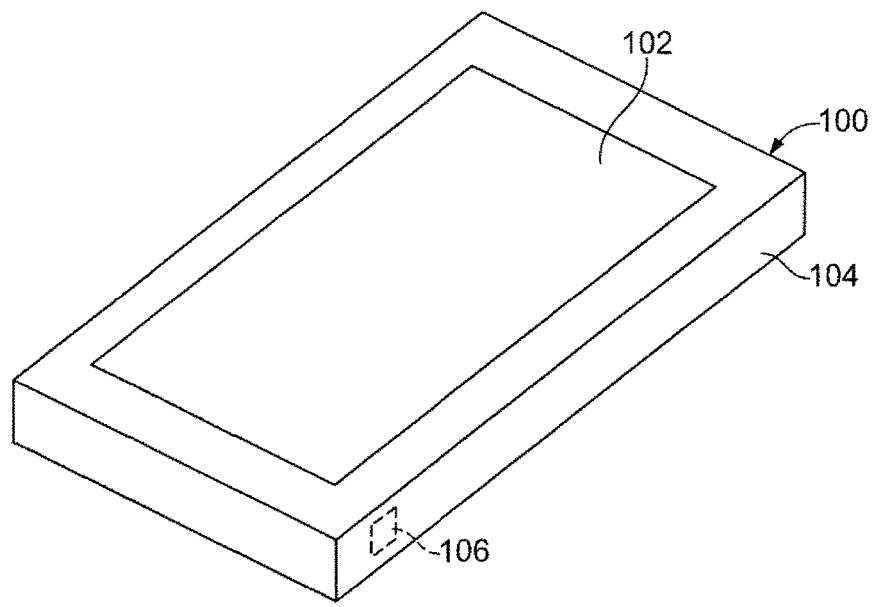
FIG. 1 is a perspective view of a touch interface device in accordance with one embodiment.

FIG. 1 is a perspective view of a touch interface device 100 in accordance with one embodiment. In accordance with one or more embodiments described herein, a planar, touch interface device 100 is provided that actively applies force on an object, such as an appendage of a human body (for example, a finger) that touches a touch surface 102 of the interface device 100. While the discussion herein focuses on a human fingertip as this appendage, it should be understood that other appendages, such as toes, can be used, or the interface device could be placed on other body surfaces, such as the torso. Additionally, the device 100 may apply forces to one or more other objects that are placed on the surface of the interface device 100, such as, for example, a stylus or a writing implement. As another example, force may be applied from the surface on a plurality of fingers. Moreover, while the discussion herein focuses on using glass as the surface of the interface device, alternatively, another type of surface can be used. The interface device 100 can be used as an input and/or output device for an electronic component. By way of example only, the interface device 100 may be a touchscreen for a mobile phone, tablet computer, another type of computer, a control apparatus for a system (e.g., a touchscreen interface to control computerized systems), and the like. The touch surface 102 may represent an electronic display that is both sensitive to touch and that visually presents information to an operator. Alternatively, the touch surface 102 may represent another surface of the device 100 that does not electronically display information to the operator. In the illustrated embodiment, the touch surface 102 is substantially flat. In other embodiments, the touch surface 102 may be, for example, curved.

In the illustrated embodiment, the interface device 100 includes an outer housing 104 disposed around the touch surface 102. The interface device 100 uses motion of the touch surface 102 along two or more axes to generate a net force on a human fingertip that is perceived by a person utilizing the interface device 100. The interface device 100 can include a processor 106 that operates based on one or more sets of instructions stored on a tangible and non-transitory computer readable storage medium (e.g., software stored on computer memory or hard wired logic) to move the touch surface 102. In one embodiment, the motions of the touch surface 102 are provided along one or more axes that lie substantially in the plane of the touch surface 102, and also along one or more axes that are not in the plane of the touch surface 102, such as along an axis that is perpendicular to the plane of the touch surface 102 and/or an axis that is obliquely angled to the plane of the touch surface 102. The motion of the touch surface 102 along one or more axes within the plane of the touch surface 102 (or, for example, along one or more directions generally along a curved touch surface) may be referred to herein as lateral motions or lateral vibrations, or planar motions or planar vibrations, of the touch surface 102. The motion of the touch surface 102 along one or more axes that are not in the plane (or along the surface) of the touch surface 102 may be referred to as oblique motions, oblique vibrations, vertical motions, vertical vibrations, perpendicular motions, or perpendicular vibrations. Also, while the terms "vibrate" and "vibratory" may be used herein to describe the motion of the touch surface 102, the touch surface 102 may be moved in other ways that do not involve vibration of the touch surface 102.

As described in more detail below, the lateral (or planar) motion and vertical (or non-planar) motion of the touch surface 102 can be used in conjunction with each other to move one or more points of the touch surface 102 in an orbit. The term "orbit" refers to the two-dimensional or three-dimensional path taken by one or more points of the touch surface 102. Based on a variety of factors, including the amplitude, frequency, and phase relationships of the lateral motions and the vertical motions, the touch surface 102 can impart a net force on one or more fingers that engage the touch surface 102. This net force can be a generally lateral force on the fingers and may be used to generate one or more haptic effects of the touch surface 102.

The net force is referred to herein as being in a lateral (or planar) direction or being generally lateral in that the force may have a vertical or non-planar component, but is experienced as a lateral force by the object engaging or contacting the touch surface 102. For example, the vertical motion may be used to change the engagement of the object with the surface, so that only during a portion of the orbit of a point on the screen is it applying a force to the object. The engagement may be changed by bringing the surface into and out of contact with the object, or the level or degree of engagement may be changed. For example, at or near a maximum level of engagement, the surface may be sufficiently urged into the object so that the corresponding lateral movement at that portion of the orbit is applied to the object as a net force.

In the illustrated embodiment, the touch surface 102 is depicted as a single continuous surface. In other embodiments, the touch surface 102 may comprise a series of separate surfaces arranged as, for example, columns or rows, that are separately articulable with respect to each other.

Figure 2:
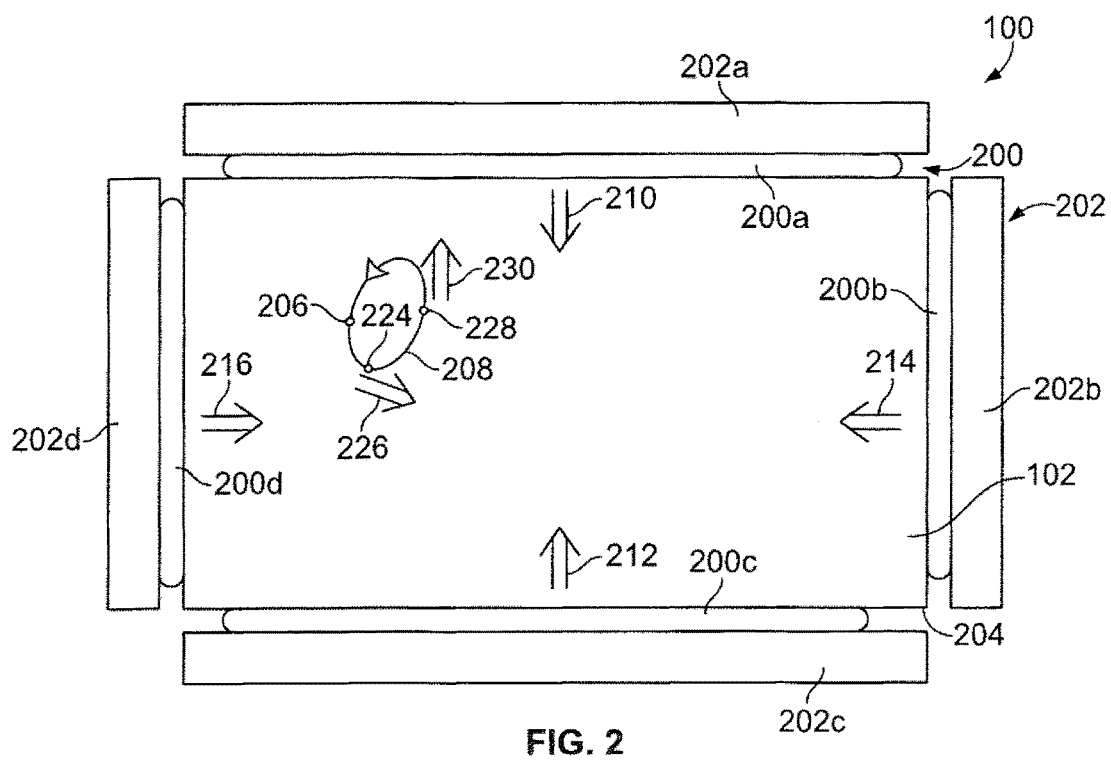
FIG. 2 is a schematic illustration of an interface device in accordance with one embodiment.

FIG. 2 is a schematic illustration of the interface device 100 in accordance with one embodiment. The interface device 100 is shown in FIG. 2 with the outer housing 104 (shown in FIG. 1) removed. Lateral (planar) motions will be described in connection with FIG. 2. The touch surface 102 is joined with actuators 200 (e.g., actuators 200a-d) that are joined to reaction masses 202 (e.g., reaction masses 202a-d). The actuators 200 are configured to move the touch surface along a lateral or planar direction, and thus may be considered lateral or planar actuators. The number and/or orientation of the actuators 200 and reaction masses 202 are provided as one example. In other embodiments, a different number and/or orientation and/or type of actuators and/or reaction masses may be used.

The actuators 200 may include, for example, piezoelectric elements, electromagnetic elements, or electrostatic elements that induce motion of the touch surface 102. Alternatively, one or more of the actuators 200 may be another type of actuator that moves the touch surface 102. The reaction masses 202 provide bodies against which the actuators 200 may push to move the touch surface 102. For example, piezoelectric actuators 200 may be energized and expand to push against the reaction masses 202 and move the touch surface 102 in an opposite direction from a reaction mass being pushed against. As another example, electrostatic actuators 200 may be energized to generate an electric field that pushes the actuators 200 away from or toward the corresponding reaction masses 202 to move the touch surface 102. In the illustrated embodiment, the actuators are depicted as being substantially co-planar with the touch surface and exerting forces that are substantially co-planar with the touch surface. In alternate embodiments, other arrangements may be employed. For example, linkages or other mechanisms may be employed to allow the actuators to be located beneath the touch surface. In such embodiments, the actuators may exert forces on the linkages or other mechanisms that are substantially parallel to the touch screen, or at a different angle, such as substantially perpendicular to the touch screen.

The reaction masses 202 may be mounted, for example, directly or indirectly to a housing, such as the housing 104 (shown in FIG. 1). The reaction masses in some embodiments are sized and configured to provide a desired resonance. Alternatively or additionally, the reaction masses may be sized and configured to symmetrize oscillations, for example in the manner of a tuning fork, to prevent or limit vibrations from passing beyond a mounting structure to a case of a handheld device associated with the touch surface. The reaction masses and/or linkages discussed above may be incorporated into a mounting assembly for the touch surface or may be implemented separately.

The actuators 200 are controlled to move the touch surface 102 in a variety of different directions, or along different paths. For example, the actuators 200a and 200c may become energized to move the touch surface 102 in a downward direction 210 and an upward direction 212, respectively, as seen from the perspective of FIG. 2. Similarly, the actuators 200b and 200d may each be energized to move the touch surface 102 in a left direction 214 and a right direction 216, respectively, as seen from the perspective of FIG. 2. Different combinations of actuators may be energized at various times to provide concurrent motion along up/down and left/right directions (in the sense of FIG. 2) to describe various paths, such as circles, ellipses, or lines (e.g., degenerate ellipses).

As shown in the embodiment of FIG. 2, the actuators 200 may be arranged in opposite pairs (e.g., a first pair of the actuators 200a and 200c and a second pair of the actuators 200b and 200d), located at several points around an outer perimeter 204 of the touch surface 102. In other embodiments, the actuators 200 may be light transmissive or transparent and located under the touch surface 102, such as a continuous sheet. Multiple actuators 200 may be distributed under the touch surface 102, even if not transparent, especially if the actuators 200 are relatively small and/or positioned so as not to interfere with the display of elements on the touch surface 102. Such distributed actuators, for example, may allow for better performance for larger area touch surfaces than edge mounted actuators.

The resulting path of motion along the plane of the touch surface 102 that is produced by one or more of the actuators 200 may be linear along a single or a varying axis, or the motion may be circular or elliptical. In the example shown in FIG. 2, the touch surface 102 is moved in an elliptical path by the actuators 200, as shown by the movement of a point 206 on the touch surface 102 along an elliptical path 208.

The various directions and/or shapes of the motion of the touch surface 102 can be produced by variously driving the several actuators 200.

For example, by energizing the actuator 202a to move the touch surface 102 downward (along direction 210) at the same time as energizing the actuator 202b to move the touch surface 102 leftward (along direction 214), the overall resulting motion will be down and to the left. By varying the selected actuator or actuators as well as the level of energization of the selected actuator or actuators, paths such as lines, circles, ellipses, or other paths may be traversed by the point 206.

The actuators 200 may laterally move the touch surface 102 in a rapid manner to laterally vibrate the touch surface 102 in various directions. The frequency at which the actuators 200 laterally vibrate the touch surface 102 may be relatively large such that movement of the touch surface 102 is not audible to a human operator of the interface device 100. Further, the frequency in embodiments is selected so that the vibration, or oscillation, of the touch screen is substantially imperceptible to human detection, resulting in a perceived sensation of a constant force or urging in a given direction or directions. In embodiments, the frequency of lateral vibrations is at least about 1 kiloHertz (kHz). In other embodiments, the frequency of lateral vibrations of the touch surface 102 may be at least 20 kHz. In other embodiments, the frequency of the lateral vibrations may be at least 30 kHz.

To reduce or minimize power consumption of a power source that energizes the actuators 200 (e.g., an internal battery or external power source), the use of resonance in vibrating the touch surface 102 may be used so that vibrational energy is not excessively dissipated. For example, a compliant mounting can be used to mount the touch surface 102 in the interface device 100 that, in combination with the mass of the touch surface 102, causes the touch surface 102 to resonate at a desired frequency. Further still, in embodiments, the reaction masses 202 may be denser and/or smaller than the touch surface 102 and the oscillations of the touch surface 102 may be symmetrized in the manner of a tuning fork, so that vibrations do not pass beyond the mounting structure, into for instance the outer housing 104 (shown in FIG. 1) of a handheld device.

The actuators 200 may also be coordinated to achieve a "focusing" of vibrational energy at selected locations on the touch surface 102, for example by a technique known as "time reversal." Vibrational energy may, for instance, be focused on the locations where the fingers are touching the surface 102. The locations of focus may track the locations of the fingertips. In this way, there would be greater vibrational energy at the fingertip locations, and less elsewhere.

As also discussed above, the actuators 200 may also be disposed underneath the touch surface 102 instead of being located at the edges. Such positioning may, for instance, reduce the size of a bezel around the perimeter of the touch surface 102. In embodiments, the actuators 200 may be distributed across a large fraction of the area of touch screen 102, or even, in embodiments, across substantially the entire area of the touch screen 102. Such positioning, for example, may help ensure that each portion of the surface of 102 moves in a desired manner.

In alternate embodiments, lateral vibration may be produced from perpendicular vibration (an example of perpendicular vibration is discussed in connection with FIG. 3) via the dynamics of the mounting, or via the dynamics of a linkage to a reaction mass. By appropriate use of compliant and massive elements in the mounting scheme, perpendicular vibration may move parts of the mounting that in turn create lateral motions of the plate. The added dynamical elements—masses, compliances, and lever-like elements—may be implemented separately from the mounting scheme, but, in other embodiments are combined into the mounting at the periphery of the surface.

Lateral and vertical vibrations may also be combined by bending of the surface. Bending motions are naturally involved in certain perpendicular motions (for example, as discussed below in connection with FIG. 4). Such bending motions typically occur about the midline of the material comprising the surface. For example, for a glass sheet about 2 millimeters in thickness, the bending occurs about 1 millimeter below the surface, with both surfaces (upper and bottom) of the sheet moving laterally as the sheet bends.

In another embodiment, lateral vibration of the touch surface 102 may be achieved by transmitting acoustic waves across the touch surface 102. For example, the actuators 200 may be acoustic transmitters oriented to generate surface acoustic waves (SAW) across the plane of the touch surface 102. The surface acoustic waves may induce lateral motion of the touch surface 102.

As shown in FIG. 2, the lateral movement of the touch surface 102 by the actuators 200 can move the touch surface 102 along a variety of paths, such as circular paths, elliptical paths 208, and the like. Alternatively, a circular or elliptical path may degenerate into a linear path, such as movement of the touch surface 102 in opposing directions. The vertical motion is controlled to be at or near a peak (where the touch surface 102 is urged into the object being contacted at or near a maximum amplitude), for example, by a controller such as the processor 106, corresponding to an appropriate point or range of points along the path 208 to select the direction in which the imparted lateral force is experienced. To vary the point or range of points selected along the path 208, the phase relationship of the vertical movement and the lateral movement may be varied. If a desired direction is not available for a given lateral path, then the lateral path may be varied by adjusting the control of lateral actuators, such as the actuators 200.

Figure 3:
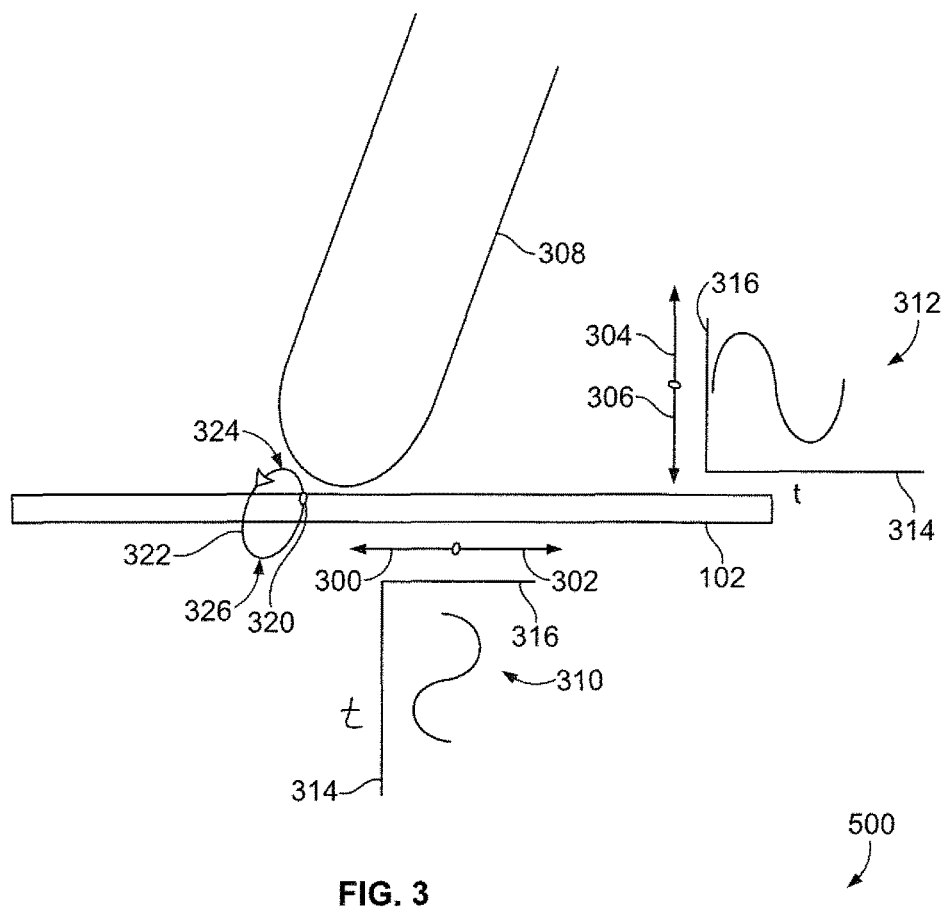
FIG. 3 is a schematic view of a touch surface of the interface device shown in FIG. 1 in accordance with one embodiment.

FIG. 3 is a schematic view of the touch surface 102 of the interface device 100 shown in FIG. 1 in accordance with one embodiment. The combination of lateral vibrations or movements (or planar vibrations or movements) with vertical vibrations or movements (or non-planar or oblique vibrations or movements) will be discussed in connection with FIG. 3. The touch surface 102 is shown from a side view in FIG. 3 as compared to the top view of the touch surface 102 shown in FIG. 2. Thus, the plane of the touch surface 102 may be understood as extending across the width and out of the page in the sense of FIG. 3. As described above, the touch surface 102 may be laterally moved or vibrated in an oscillatory manner. Lateral arrows 300, 302 in FIG. 3 represent some of the lateral motion of the touch surface 102. Due to the perspective of FIG. 3, and for ease of explanation, the lateral motion appears as being limited to linear motion along the opposite lateral arrows 300, 302. As described above, however, the lateral motion may follow a non-linear path, such as a circular or elliptical path 208 (shown in FIG. 2). The lateral arrows 300, 302 may represent only a portion or component of the lateral motion of the touch surface 102.

In addition to the lateral motion, the touch surface 102 may be moved along an axis that is out of the plane of the touch surface 102, such as by being vertically moved or vibrated along the opposite vertical arrows 304, 306. The vertical direction, as used in connection with FIG. 3, is substantially perpendicular to a plane defined by the touch surface 102. Alternatively, the touch surface 102 may be moved along another axis or direction. The vertical movement of the touch surface 102 may be a vibratory or periodic motion at a relatively high frequency, such as a frequency that is at least 1 kHz. In other embodiments, the frequency of the vertical vibration may be at least about 20 kHz. As another example, the frequency of the vertical vibrations may be at least about 30 kHz. In embodiments, the frequencies of both the lateral vibrations and the vertical vibrations are at least about 20 kHz or at least about 30 kHz. The frequencies of the lateral vibrations may differ or be the same as the frequencies of the vertical vibrations.

Further, in embodiments, the resonances of the lateral vibrations and the perpendicular vibrations are near enough in value so that a minimum of power is dissipated. Because the vertical and lateral resonances may have different inertial and compliant elements associated therewith, and also due to manufacturing tolerances and inconsistencies, the lateral and vertical resonances may not be identical in frequency. However, due to non-zero resonant bandwidths, the resonances do not need to be identical to be driven efficiently at the same frequency. In other embodiments, one of the lateral and vertical resonances may be a harmonic of the other resonance. In embodiments, the resonances have a high quality factor (Q) so that a minimum of power is dissipated.

Similarly, the embodiment shown in FIG. 2 may be used to generate lateral vibrations alone, or to generate both lateral vibrations and vertical vibrations of the touch surface 102. For example, vertical vibrations of the touch surface 102 may be generated due to bending of the touch surface 102 caused by the actuators 200.

Returning to the discussion of FIG. 3, two graphs 310, 312 are shown in FIG. 3. The graphs 310, 312 represent the periodic or oscillatory movement of the touch surface 102. For example, the graph 310 represents the periodic lateral movement of the touch surface 102 along two or more directions (e.g., along the lateral arrows 300, 302) and the graph 312 represents the periodic vertical movement of the touch surface 102 along the vertical arrows 304, 306. Both graphs 310, 312 are shown alongside axes 314 representative of time and axes 316 representative of amplitude or magnitude of the corresponding lateral motion or vertical motion. The movements represented by the graphs 310, 312 are provided merely as examples. The periodic lateral motion represented by the graph 310 may have a different amplitude, frequency, and/or phase than the periodic vertical motion represented by the graph 312.

As shown in FIG. 3, the combination of the vertical and lateral movement of the touch surface 102 defines a path of travel, or orbit 322, of a point 320 on the touch surface 102. In the illustrated embodiment, the orbit 322 is an ellipse, and the point 320 traverses the orbit 322 in a counterclockwise direction. By altering the phase relationship of the vertical and lateral movements, the direction could be changed to clockwise. Also, by altering the phase and/or amplitude of the motions, different shapes of orbit may be produced, including degenerate ellipses in which the ellipse collapses to a line. The orbit 322 includes an upper peak 324 describing a location at which the point 320 is urged a maximum distance upward into the finger 308, and a lower peak 326 at which the point 320 is urged a maximum distance downward away from the finger 308.

The out-of-plane motion of the touch surface 102 along the orbit 322 (also corresponding to vertical arrow 304) can cause the touch surface 102 to move up toward a finger 308 and contact or engage the finger 308 at or near the upper peak 324 of the orbit 322. Alternatively or additionally, the out-of-plane motion of the touch surface 102 may further compress the touch screen 102 against a finger 308 that already is in an engaged relationship (e.g., physically contacting) with the finger 308, thus increasing a level or amount of engagement. When the touch surface 102 moves upward to engage or further compress against the finger 308, the concurrent lateral motion of the touch screen 102 imparts a laterally directed force on the finger 308. For example, if the vertical motion of the touch surface 102 along the vertical arrow 304 causes the touch surface 102 to engage the finger 308 when the touch surface 102 also is laterally moving along the lateral arrow 302, then the touch surface 102 may impart a net force on the finger 308 that pushes the finger 308 generally along the lateral direction 302. As another example, if the vertical motion of the touch surface 102 along the vertical arrow 304 causes the touch surface 102 to engage the finger 308 when the touch surface 102 also is laterally moving along the opposite lateral arrow 300, then the touch surface 102 may impart a net force on the finger 308 that pushes the finger 308 generally along the lateral direction 300. The net force that is imparted on the finger 308 can be referred to as a net lateral force or lateral force. A force imparted along a surface as discussed herein may be, for example, generally planar with a generally planar touch surface, generally coincident with a curved touch surface, or at a relatively small angle (e.g. a few degrees) to a touch surface.

When the touch surface 102 moves downward, toward the lower peak 326 (also corresponding to vertical arrow 306) to dis-engage or reduce a level of engagement with the finger 308, the lateral motion is not conveyed strongly to the finger 308 (because, for example, the finger does not contact the surface, or as another example, because the level of engagement is low, or as another example, because the level of engagement is reduced so that the movement is sensed much less strongly than movement at or near the upper peak 324 of the orbit 322). Thus, by an "engage and push" phenomenon the object is affected strongly by only a portion of the lateral path traversed by the touch surface.

Human sensitivity to vibration diminishes at higher frequencies. Thus, by selecting appropriately high frequencies, the engage-and push phenomenon is experienced by a human user as a continuous push. For example, in embodiments, frequencies of about 20 kHz or higher are employed. In other embodiments, for example, frequencies of about 30 kHz or higher are employed. Further still, embodiments described herein may provide an experienced lateral force to a non-moving object, such as a finger, in contrast to methods that rely on frictional modulation to apply a force to a moving finger. (It should be noted that friction modulation may be used to accentuate the experienced movement in certain embodiments, as discussed below.)

In one embodiment, lateral forces may be imposed on the finger 308 by the combination of lateral movement and vertical movement of the touch surface 102 at the same time as a friction coefficient of the touch surface 102 is changed. Friction may be changed, for example, by varying the amplitude of the vertical movement. For example, larger vertical movements may result in increased friction coefficients of the touch surface 102. Conversely, smaller vertical movements may result in reduced friction coefficients of the touch surface 102. As another example, friction may be varied by use of a force resulting from electrostatic attraction. The sensations of controllable lateral drive (e.g., imparting a net lateral force on the finger 308) and of "slipperiness" (e.g., changing the friction coefficient of the touch surface 102) may be distinguishable to the user and independent selection and control of these sensations can confer greater design freedom in creating a touch user interface with the touch surface 102.

The direction of the lateral force imparted on the finger 308 can be selected or controlled by varying the axes of the lateral vibrations and/or vertical vibrations of the touch surface 102. For example, changing a direction of the lateral vibrations can cause the finger 308 to be driven in another direction along the lateral vibrations when the touch surface 102 moves upward and engages the finger 308. Utilizing lateral motions traversing shapes such as circles or ellipses in certain embodiments allows for the chosen direction to be changed by varying the phase relationship of the lateral and vertical movements without necessarily requiring alteration of the lateral movement.

For example, FIG. 2 depicts an elliptical path 208 being traversed in a counterclockwise direction. By controlling the vertical and lateral movement such that an object is engaged (or a level of engagement is increased) at a given point along the elliptical path 208 and not engaged (or a level of engagement is decreased) at other points along the elliptical path 208, a direction may be selected. For example, direction 226 is tangential to the elliptical path 208 at point 224. To select direction 226 as the direction at which the net lateral force is imparted to the finger 308, the vertical and lateral oscillations or vibrations are controlled so that an upper peak of an orbit, such as orbit 322 in FIG. 3, occurs at about point 224.

In some embodiments, the lateral and vertical vibrations occur at substantially the same frequency. By altering one or both frequencies slightly, the phase relationship of the vibrations may be changed. This change in phase relationship may be used to alter the point along the elliptical path 208 at which the upper peak of the orbit occurs. For example, by altering the phase relationship so that the upper peak of the orbit occurs at about point 228, the direction of the net lateral force is shown by direction 230 (tangential to the elliptical path 208 at point 228). Thus, by using a lateral path such as an ellipse, different directions of imparted net lateral force may be selected by varying the phase relationship of the vertical and lateral oscillations, without necessarily altering the path of the lateral oscillation. In other embodiments, shapes other than ellipses may be employed, such as circles or lines. In other embodiments, the direction of the net lateral force imparted is altered by varying the axis of the lateral vibration, either additionally or alternatively to adjusting the phase relationship between the lateral and vertical vibrations.

The magnitude and direction of the lateral force on the finger 308 may be selected or controlled by varying amplitudes of the lateral vibrations and vertical vibrations. For example, larger lateral vibrations of the touch surface 102 may impart a greater net force on the finger 308 when the touch surface 102 moves upward to engage or compress the finger 308. Conversely, smaller lateral vibrations can impart a smaller net force on the finger 308. Larger vertical vibrations of the touch surface 102 may impart a larger net force on the finger 308, as the touch surface 102 may compress the finger 308 to a greater degree during the upward movement of the touch surface 102.

As also discussed above, the magnitude and direction of the lateral force on the finger 308 may be selected or controlled by varying the relative phases, or phase relationship, of the lateral vibrations and vertical vibrations. For example, the difference in phases of the periodic lateral vibrations and of the periodic vertical vibrations may change the direction and/or magnitude of the lateral movement of the touch surface 102 when the touch surface 102 moves upward to engage or compress the finger 308. As described above, the direction and/or magnitude of the lateral movement of the touch surface 102 can impart a lateral force on the finger 308 in a same or similar direction when the touch surface 102 engages the finger 308.

In some embodiments, the frequency of perpendicular (vertical) vibrations (referred to as $f_{perp}$) is equal to or substantially the same as the frequency of the lateral vibrations (referred to as $f_{lat}$), while in other embodiments, the frequency of the perpendicular vibrations may differ from the frequency of the lateral vibrations. If $f_{lat}=f_{perp}$ (or harmonic multiples), the phase and/or amplitude of the two motions may be utilized to produce a desired path of movement of a portion of the touch surface. In one embodiment, for example, the vertical and lateral motions are ninety degrees out of phase with respect to each other and the amplitude of $f_{lat}$ is varied. The out of phase motions can combine to produce an elliptical motion of the touch surface 102, as described above. Other phase angles may be of interest in generating linear, elliptical, or circular motions.

As also discussed above, the interface device 100 may be configured to provide resonances that allow the efficient conservation of power in the interface device 100, for example, to reduce the sizes of the actuators 200 (shown in FIG. 2) and/or power requirements of the interface device 100. For example, a resonant lateral vibration may be established along a first axis, and the first axis can be rotated to a new selected axis without losing much of the energy stored in the resonance. The phase of a resonant vibration may be rotated or moved to a new selected phase without losing much of the energy stored in the resonance. The interface device 100 may be configured to provide a desired resonance or resonances, for example, by appropriately selecting the configuration of the mounting of the screen, the size of the reactive masses, and the size of the touch surface.

Figure 4:
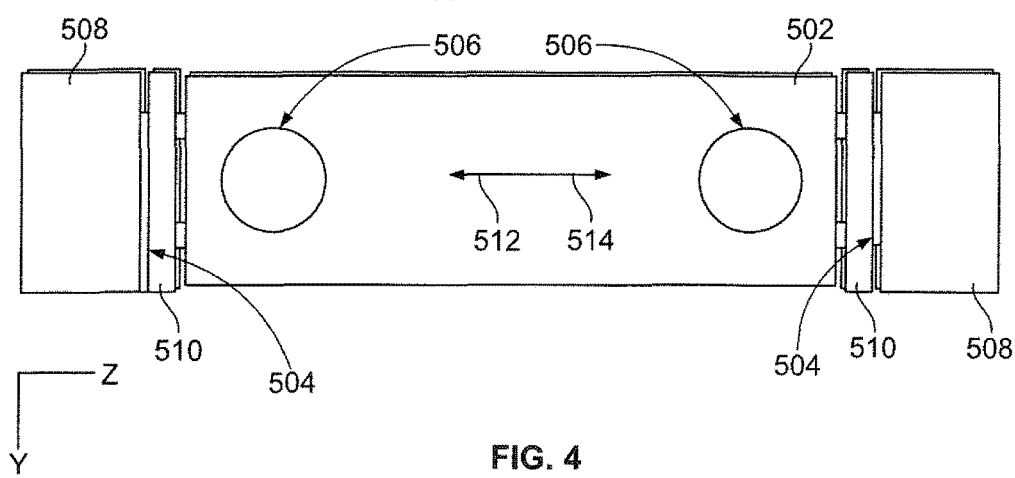
FIG. 4 schematically illustrates another embodiment of an interface device.

FIG. 4 schematically illustrates another embodiment of an interface device 500. The interface device 500 may be similar to the interface device 100 (shown in FIG. 1). The interface device 500 may include an outer housing that is similar to the housing 104 (shown in FIG. 1). The interface device 500 includes a touch surface 502 that may be similar to the touch surface 102 (shown in FIG. 1) and that is concurrently or simultaneously moved in two or more axes to define a lateral path used to impart a net lateral force on the finger 308 when combined with a vertical motion, as described above. The discussion of the interface device 500 illustrates one example of providing vertical movement of the touch surface 502. The interface device 500 provides vertical movement of the touch surface 102 in addition to lateral movement.

The interface device 500 includes lateral actuators 504 and vertical actuators 506. The actuators 504, 506 may be piezoelectric elements. Alternatively, one or more of the actuators 504, 506 may be another type of actuator that moves the touch surface 502 laterally and vertically, such as electrostatic actuators. The lateral actuators 504 are coupled with reaction masses 508 and coupler bodies 510. The coupler bodies 510 are joined with the touch surface 502. The lateral actuators 504 are disposed on opposite sides of the touch surface 502. The embodiment depicted in FIG. 5 only includes lateral actuators on one pair of opposite sides of the touch surface, allowing for left-right movement (in the sense of FIG. 5), but additional directions of movement may be provided for in alternative embodiments. For example, additional lateral actuators 504, coupler bodies 510, and/or reaction masses 508 can be provided in other locations, such as by being disposed on the other two opposite sides of the touch surface 502.

The lateral actuators 504 are energized to move the touch surface 502 in one or more lateral directions 512, 514. The lateral actuators 504 push against the reaction masses 508 to move the touch surface 502 in the lateral directions 512, 514. The longitudinal compliance of the touch surface 502, the reaction masses 508, and the lateral actuators 504 can form a resonant system. Perpendicular motion of the touch surface 502 may be created by the vertical actuators 506. The vertical actuators 506 may be energized to bend the touch surface 502 and thereby vertically move portions of the touch surface 502 (e.g., in and out of the page of FIG. 4, or in and out of a plane defined by the touch surface 502 at rest).

In embodiments, the interface device 500 is configured (for example, by selection of mounting components, reaction masses, and the like) such that the resonance for the lateral vibrations, and that for the vertical vibrations, may be near or equivalent to each other in frequency. Thus, for example, a bending mode resonant frequency of the touch surface 502 may be substantially similar to a longitudinal resonant frequency of the resonant system formed by the longitudinal compliance of the touch surface 502, the reaction masses 508, and the lateral actuators 504, with conventional oscillators and amplifiers used to drive both the lateral actuators 504 and the vertical actuators 506. Alternatively, the frequency of the lateral vibrations or vertical vibrations may be a harmonic of the other. The frequency of the lateral vibrations and/or the vertical vibrations may be shifted or changed slightly from time to time, for a brief interval, in order to change the phase relationship of the lateral and vertical vibrations without losing significant energy in so doing. Also, the amplitude of either or both oscillations may be adjusted if desired. As described above, changing the direction or magnitude of the lateral force exerted on the finger 308 (see FIG. 3) may be accomplished by changing the phase relationship between the vertical vibration and the lateral vibration in one or two axes in the plane of the surface.

Figure 5:
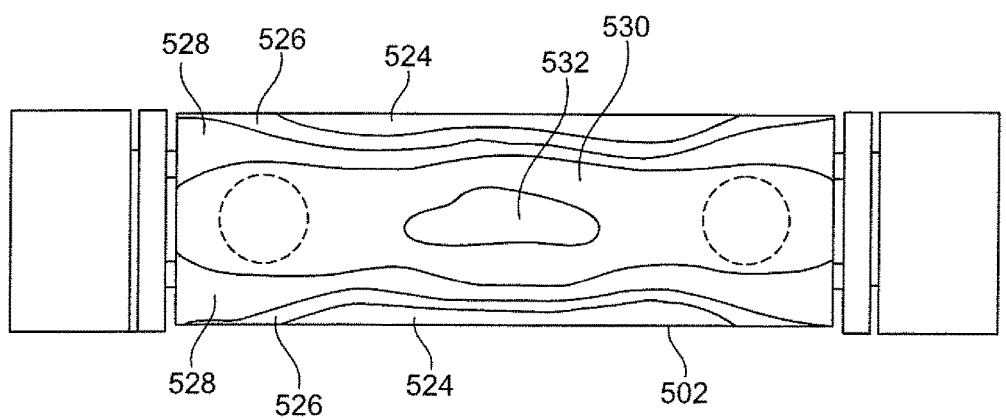
FIG. 5 is a mode shape map of an example of the touch surface shown in FIG. 4 in a bending mode.

FIG. 5 is a mode shape map of an example of the touch surface 502 in a bending mode. The color map indicates amplitude of out-of-plane vibration, which peaks at approximately +/−1.5 microns. The resonant frequency associated with this bending mode for the depicted embodiment is about 22 kHz, although in other embodiments other frequencies could be used. The distances represented in the map shown in FIG. 5 are provided merely as examples and are not intended to be limiting on all embodiments described herein. In FIG. 5, different zones are used to depict different ranges of amplitude at a given moment during the bending of the illustrated touch surface. For example, the zones 524 located along the edges of touch surface have an amplitude range of about 1 to 1.5 microns. The zone 532, located toward the center of the touch surface, has an amplitude of about −0.5 microns to about −1 microns. Intermediate zones 526 (about 0.5 microns to about 1 micron), 528 (about 0 to about 0.5 microns), and 530 (about 0 to about −0.5 microns) have amplitude ranges between those of the zones 524 and 532.

Figure 6:
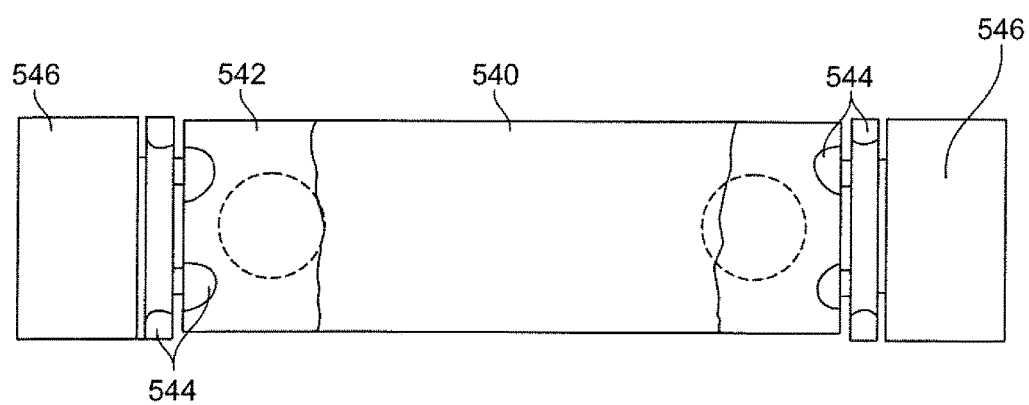
FIG. 6 is a mode shape map of an example of the touch surface shown in FIG. 4 when the touch surface is laterally moving.

FIG. 6 is a mode shape map of an example of the touch surface 502 for lateral oscillation. In the mode shape of FIG. 6, the touch surface 502 is resonating out-of-phase with the two reaction masses 508. In FIG. 6, the zones 546 associated with the reaction masses have an amplitude range of about 0.5 microns to about 1.5 microns, whereas the zone 540 associated with the center of the touch surface has an amplitude range of about −1 microns to about −2 microns. The intermediate zones 542 have an amplitude range of about −0.5 microns to about −1 microns. Also, the zones 544 have an amplitude range of about −0.5 microns to about 0.5 microns. The zones 544 have the smallest amplitude, or are the most neutral, and thus may be used as mounting locations. The reaction masses 508 may be tuned so that the frequency of this lateral resonance matches that of the bending mode resonance shown in FIG. 5. The amplitudes of the lateral resonance and the bending mode resonance may be approximately the same as well, although other amplitudes could be used.

In one embodiment, the interface device 100 (shown in FIG. 1) controls the net lateral force imparted on the finger 308 by applying an electrostatic force on the finger 308 at the same time that the vertical movement of the touch surface 102 lifts the touch surface 102 to engage the finger 308 and the lateral movement of the touch surface 102 imparts the lateral force on the finger 308. The electrostatic force may attract the finger 308 toward the touch surface 102 and thereby increase the engagement and, therefore, also increase the net lateral force on the finger 308. Alternatively, the electrostatic force may provide sufficient engagement between the surface and the finger, even in the absence of vertical motion of the surface. For example, in order to increase the net lateral force on the finger 308, the interface device 100 may apply an electrostatic force on the finger 308 to attract the finger 308 toward the touch surface 102 at the same time that the touch surface 102 moves up toward the finger 308 and the lateral movement of the touch surface 102 laterally drives the finger 308 in a desired direction. Electrostatic force may be used alternatively or additionally to vertical actuators as discussed above, for example, with an attractive electrostatic force corresponding to an upper peak of an orbit provided by vertical actuators. Electrostatic force in some embodiments is more amenable to the creation of multiple independent regions each acting differently. A surface may be divided into many portions or pads each receiving a force or sensation dedicated to that portion or pad. Thus, for example, several fingers may touch a surface at or about the same time, with each finger receiving its own lateral force and/or texture and/or friction level.

Figure 7:
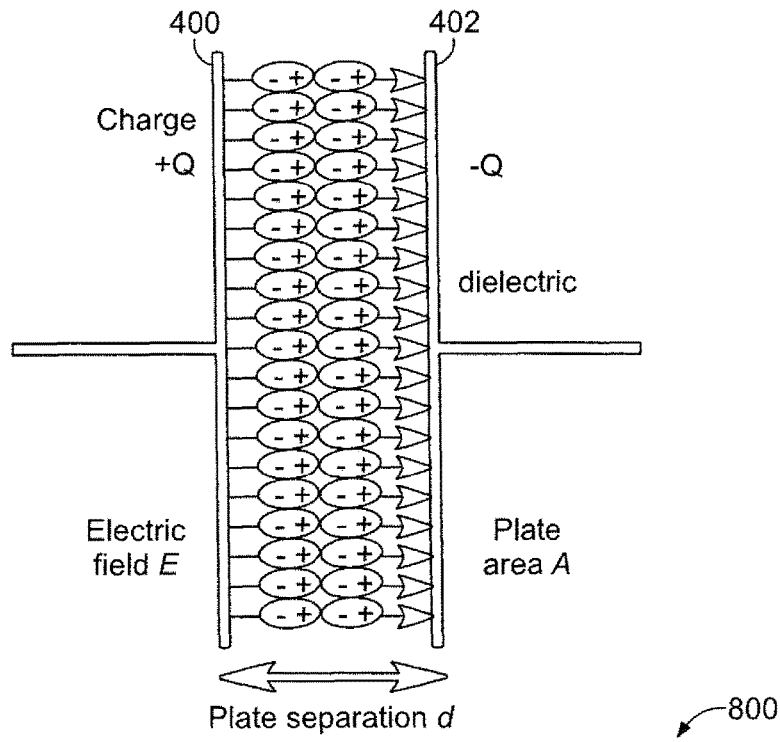
FIG. 7 is a schematic diagram of electrostatic force between two objects.

FIG. 7 is a schematic diagram of electrostatic force between two objects. The electrostatic force between two objects, such as between the finger 308 and the touch surface 102 of the interface device 100 can be modeled after a parallel plate capacitor. For example, in the illustrated example, a first object 400 represents an electrode disposed below the touch surface 102 of the interface device 100 and a second object 402 represents the finger 308. The objects 400, 402 are separated by a separation distance (a). An electric potential difference, or voltage, (V) is applied to create an electric field (E) between the objects 400, 402. The electric field (E) is related to the potential difference (V) across the objects 400, 402 divided by the separation distance (d). For present purposes, it shall be assumed that the dielectric constant does not vary across the separation.

In one embodiment, the length across the objects 400, 402 or the surface area of interaction between the objects 400, 402 is relatively large compared to the separation distance (d). The electrostatic normal force (F) between the objects 400, 402 may be modeled as in a parallel plate capacitor and based on the following relationship:

$$F = \frac{\varepsilon\varepsilon_o A V^2}{2d^2} \qquad \text{(Equation \#1)}$$

where F represents the electrostatic normal force, $\varepsilon$ represents the relative permittivity (also known as the dielectric constant) of the touch surface, $\varepsilon_o$ represents the permittivity of free space ($=8.85\times10^{-12}$ Farads per meter), A represents the surface area of interface between the objects 400, 402, V represents the potential difference across the objects 400, 402, and d represents the separation distance between the objects 400, 402.

The electrostatic normal force (F) may be estimated by assuming that the dielectric constant ($\varepsilon$) is 5, the surface area (A) is $1\times10^{-4}$ square meters ($m^2$), and the separation distance (d) is $1\times10^{-5}$ meters (m). For a potential difference (V) of 150 volts, the electrostatic normal force is approximately 0.5 Newtons. This normal force would add on to the normal force arising from vertical vibration of the touch surface and the associated compression of the fingertip. An increased normal force gives rise to increased lateral force. A rough estimate of lateral force is the normal force times the coefficient of friction. The coefficient of friction of skin on glass may be approximately unity, although it may be more or less depending on factors such as surface finish. As a result, average lateral forces of about 0.25 Newtons or greater may be applied to the finger that touches the surface. The electric field associated with the above parameters is $E=V/d=1.5\times10^7$ Volts per meter (V/m), which may be less than the breakdown strength of many insulators, such as parylene ($2.8\times10^8$ V/m). Thus, even higher electric field strengths than $1.5\times10^7$ V/m may be feasible without exceeding the breakdown strength of the touch surface.

Figure 8:
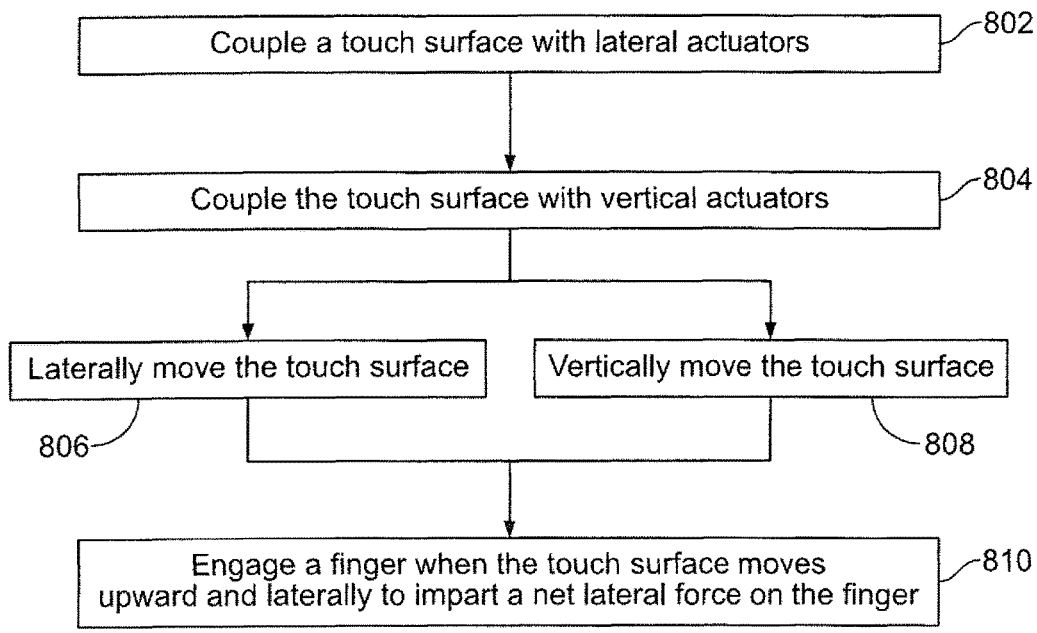
FIG. 8 is a flowchart of one embodiment of a method for imparting a lateral force on a human appendage (e.g., a finger) with a touch surface of an interface device.

FIG. 8 is a flowchart of one embodiment of a method 800 for imparting a lateral force on a human appendage (e.g., a finger) with a touch surface of an interface device. The method 800 may be used in conjunction with one or more of the interface devices, such as interface devices 100, 500 shown and described above.

At 802, a touch surface is coupled with lateral actuators. For example, a touch surface, such as one of the touch surfaces 102, 502 discussed above may be coupled with lateral actuators, such as the actuators 200, 504 discussed above, that laterally move the touch surfaces 102, 502 in one or more directions in the planes of the touch surfaces 102, 502.

At 804, the touch surface is coupled with vertical actuators. For example, the touch surfaces 102, 502 may be coupled with vertical actuators, such as the actuators 506 discussed above, that vertically move the touch surfaces 102, 502 in one or more directions that are oriented perpendicular or obliquely to the planes of the touch surfaces 102, 502.

At 806, the touch surface is laterally moved. As 808, the touch surface is vertically moved. The movements associated with 806 and 808 may occur simultaneously or concurrently. For example, the touch surfaces 102, 502 may vibrate in two or more directions in the planes of the touch surfaces 102, 502 at the same time that the touch surfaces 102, 502 bend or otherwise move vertically in two or more directions. The combined lateral and vertical movements of the touch surfaces 102, 502 can cause one or more points on the touch surfaces 102, 502 to move in a two or three dimensional orbit, such as the circumnavigation of a circle, ellipse, line, quadrilateral, sphere, ellipsoid, or the like.

At 810, the touch surface engages an appendage to impart a lateral force on the appendage. For example, the touch surfaces 102, 502 may engage one or more fingers 308 to impart a lateral force on the fingers 308. As described above, the vertical movement of the touch surfaces 102, 502 may cause the touch surfaces 102, 502 to engage and/or press against the fingers 308 and the lateral movement of the touch surfaces 102, 502 may impart the lateral force on the fingers 308.

In accordance with one or more embodiments described herein, haptic effects can be created in a touch device by modulating the shear forces applied to a fingertip as a function of finger location, finger velocity, and/or finger acceleration. The shear force also can depend on events occurring in a computer program, such as a "virtual" collision occurring in an electronic game that is played on the touch device.

It should be appreciated that the ability to modulate force on one or more appendage is part of what makes haptic feedback via a touch surface possible. To create haptic experiences that are useful and/or interesting, it is generally important to generate forces that closely correspond to specific actions of the fingertips and/or to specific events occurring under software control. By way of illustration, consider a game in which the fingertips are used both to bat a ball, and to capture the ball. In this illustration, the ball is a simulated ball that appears on a computer display disposed underneath the touch surface. Consider the act of batting the ball with one finger. In this case, the lateral force generated by certain methods and systems described herein would depend on both the position and velocity of the finger as well as the position and velocity of the simulated ball. Even higher derivatives of position, such as acceleration, might also be involved. In one embodiment, the force exerted on the finger might increase when the position of the finger intersects that of the surface of the ball, indicating a collision. The force might also depend on the relative velocity of the finger and the ball, increasing for higher velocities. Thus, unlike many existing technologies, the force is not a simple vibration, but is an active force that varies as a function of state variables such as positions, velocities and accelerations. Now consider the act of capturing the ball and holding it between two fingers. In this case, the reaction forces at the two fingers, which are again functions of state variables such as positions and velocities, should point in approximately opposite directions. As the ball is held, the forces should persist. Unlike many existing technologies, the force provided by certain embodiments described herein is neither a simple vibration nor even a transient. The abilities to generate persistent forces, and to generate different forces at different fingers, are advantages of the technology described here. In the above discussion, it should be apparent that the technology described here may be integrated with means of measuring the position of one or more fingertips, and with means of displaying graphic images (and also audio, since events like batting a ball are often accompanied by sound).

There are many techniques for measuring fingertip positions and which may be used here. These include, without limitation, resistive, surface capacitive, projected capacitive, infrared, acoustic pulse recognition, and in-cell optical sensing. There are also many techniques for displaying graphic images and audio. Most of these may combine easily with the lateral drive techniques described here, but capacitive and projective capacitive sensing might seem to interfere with the rapidly varying electric fields used in the electrostatic embodiments. However, capacitive and projective capacitance sensing may be done at a much higher frequency, in the megahertz range, with filtering to separate the signals related to capacitive sensing from those resulting from actuation. It may be desirable to use the same electrodes for both purposes.

In accordance with one embodiment, a method for applying force from a surface to an object is provided. The method includes moving the surface in one or more lateral directions of the surface, wherein the moving in one or more lateral directions is performed periodically at a frequency of at least about 1 kiloHertz. The method also includes periodically moving the surface in at least one angled direction that is at least one of obliquely or perpendicularly angled to the surface. The generally planar surface articulates into and out of contact with the object or varies in degree of engagement with the object. The method further includes controlling the moving in one or more lateral directions and moving in at least one angled direction to impart a force that is oriented along the surface, wherein the force is configured to provide a haptic output to an operator of a device that includes the surface.

In another aspect, the moving in one or more lateral directions and moving in at least one angled direction are performed at substantially the same frequency. Further, in embodiments, a direction of the imparted force is varied by varying a phase relationship between the moving in one or more lateral directions and moving in at least one angled direction.

In another aspect, one of the moving in one or more lateral directions and moving in at least one angled direction is performed at a harmonic frequency of the other of the moving in one or more lateral directions and moving in at least one angled direction.

In another aspect, the moving in one or more lateral directions is performed periodically at a frequency substantially above a frequency that vibrations are tactilely perceived by humans. The moving in one or more lateral directions may be performed periodically at a frequency of at least about 20 kiloHertz. Further, in some embodiments, the moving in one or more lateral directions is performed periodically at a frequency of at least about 30 kiloHertz.

In another aspect, the method further includes modulating a frictional force experienced by the object concurrently with the moving in at least one angled direction. For example, in some embodiments, the frictional force is modulated by varying an electrostatic attraction between the object and the surface. Optionally, the electrostatic attraction has a different amplitude or phase at a plurality of points distributed about the surface, whereby a plurality of objects contacting the surface experience different imparted forces.

In another aspect, the surface is generally planar and the one or more lateral directions of the surface are substantially co-planar with the surface.

In another embodiment, a touch interface device is provided. The touch interface device includes a touch surface configured to be engaged by an object. The touch interface also includes a first actuator assembly operably connected to the touch surface. The first actuator assembly is configured to displace the touch surface in one or more lateral directions along the touch surface at a first frequency that is at least about 1 kiloHertz. Further, the touch interface includes a second actuator assembly operably connected to the touch surface. The second actuator assembly is configured to displace the touch surface in an angled direction that is at least one of obliquely or perpendicularly angled to the touch surface at a second frequency. The touch interface device also includes a controller operably connected with the first and second actuator assemblies. The controller is configured to operate the first and second actuator assemblies so that the touch surface varies in engagement with the object to impart a force on the object that is along the touch surface.

In another aspect, the first actuator assembly is configured to displace the touch surface at a first frequency that is at least about 20 kiloHertz.

In another aspect, the first actuator assembly is configured to displace the touch surface at a first frequency that is at least about 30 kiloHertz.

In another aspect, the first frequency and the second frequency are substantially the same.

In another aspect, the controller is further configured to vary a direction of the imparted force by varying a phase relationship between a first oscillation in the one or more lateral directions and a second oscillation in the angled direction.

In another aspect, the touch interface device includes a first massive system and a second massive system. The first massive system includes at least one of a first mounting or a first reactive mass. The second massive system includes at least one of a second mounting or a second reactive mass. The resonances of the first massive system and the second massive system are substantially the same.

In another embodiment, a tangible and non-transitory computer readable storage medium for a system that includes a processor is provided. The computer readable storage medium includes one or more sets of instructions configured to direct the processor to control a first actuator assembly to move a touch surface in one or more lateral along the touch surface, wherein the first actuator assembly moves the generally planar surface in the one or more lateral directions periodically at a frequency of at least about 1 kiloHertz. The processor is also directed to control a second actuator assembly to move at least a portion of the generally planar surface in at one or more angled directions that are at least one of obliquely or substantially perpendicularly angled to the touch surface. The second actuator assembly moves the touch surface periodically. The processor is further directed to control motion in the one or more lateral directions and motion in one or more angled directions to impart a force on the object along the touch surface, wherein the force is configured to provide haptic output to an operator of a device that includes the touch surface.

In another aspect, the motion in one or more lateral directions and motion in one or more angled directions are performed at substantially the same frequency. Further, in embodiments, a direction of the imparted force is varied by varying a phase relationship between the motion in one or more lateral directions and motion in one or more angled directions. In another aspect, the processor is further configured to modulate a frictional force experienced by the object concurrently with the motion in one or more angled directions. For example, in embodiments the frictional force is modulated by varying an electrostatic attraction between the object and the touch surface. Further, in additional embodiments, the electrostatic attraction has a different amplitude at a plurality of points distributed about the touch surface, whereby a plurality of objects contacting the touch surface experience different imparted forces.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the one or more embodiments of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claims limitations expressly use the phrase "means for" followed by a statement of function void of further structure.

This written description uses examples to disclose several embodiments of the inventive subject matter, and also to enable a person of ordinary skill in the art to practice the embodiments disclosed herein, including making and using any devices or systems and performing any incorporated methods. The patentable scope of the subject matter may be defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the disclosed subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. In embodiments, one or more of the functional blocks are implemented via a non-transitory computer storage medium that does not include signals. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the presently described inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the subject matter herein involved, it is intended that all of the subject matter of the above description or shown in the accompanying drawings shall be interpreted merely as examples illustrating the inventive concepts herein and shall not be construed as limiting the disclosed subject matter.

What is claimed is:

1. A method for applying a continuous pushing force from a touch surface to a body part, the method comprising:
   a controller operating a first and second plurality of actuators to move the touch surface to impart the continuous pushing force on the body part at a point of maximum engagement;
   wherein the first plurality of actuators moves the touch surface in one or more lateral directions;
   wherein the second plurality of actuators moves the touch surface at an angled direction that is obliquely or perpendicularly angled to the touch surface;
   wherein the moving in one or more lateral directions is performed periodically such that movement of the touch surface in the one or more lateral directions is less perceptible to detection from the body part away from the point of maximum engagement;
   periodically moving the touch surface in the angled direction into and out of contact at the point of maximum engagement with the body part or varies in a degree of engagement with the body part such that movement of the touch surface in the angled direction is less perceptible to detection from the body part away from the point of maximum engagement;
   controlling and synchronizing movement of the touch surface in the one or more lateral directions and movement of the touch surface in the angled direction also includes modulating at least one of amplitude, phase and frequency of the lateral and angular movements; and
   wherein said modulation is less perceptible to detection from the body part away from the point of maximum engagement and produces the tactilely perceptible continuous pushing force on the body part at the point of maximum engagement, the pushing force being oriented in a lateral direction along the touch surface.

2. The method of claim 1 wherein the movement in the one or more lateral directions and in the angled direction are performed at substantially the same frequency.

3. The method of claim 2 wherein a direction of the imparted force is varied by varying a phase relationship between the moving in one or more lateral directions and moving in the at least one angled direction.

4. The method of claim 1 wherein one of the movement in the one or more lateral directions and angled direction is performed at a harmonic frequency of the other.

5. The method of claim 1 wherein the movement in the one or more lateral directions is performed periodically at a frequency of at least about 1 kilo Hertz.

6. The method of claim 1 wherein the movement in the one or more lateral directions is performed periodically at a frequency of at least 20 kilo Hertz.

7. The method of claim 1 wherein the movement in the one or more lateral directions is performed periodically at a frequency of at least 30 kilo Hertz.

8. The method of claim 1 further comprising modulating a frictional force experienced by the object concurrently with the movement in the at least one angled direction.

9. The method of claim 8 wherein the frictional force is modulated by varying an electrostatic attraction between the object and the surface.

10. The method of claim 9 wherein the electrostatic attraction has a different amplitude or phase at a plurality of points distributed about the surface, whereby a plurality of objects contacting the surface experience different imparted forces.

11. The method of claim 1 wherein the surface is generally planar and the one or more lateral directions of the surface are substantially co-planar with the surface.

12. A touch interface device comprising:
a touch surface configured to be engaged by an object by applying a continuous pushing force at a point of maximum engagement;
a first actuator assembly operably connected to the touch surface,
the first actuator assembly configured to oscillate the touch surface in one or more lateral directions along the touch surface,
wherein the first actuator assembly oscillates the touch surface at a first frequency wherein the movement of the touch surface is less perceptible to detection by the object away from the point of maximum engagement;
a second actuator assembly operably connected to the touch surface,
wherein the second actuator assembly oscillates the touch surface in an angled direction that is obliquely or perpendicularly angled to the touch surface,
wherein the second actuator assembly oscillates the touch surface at a second frequency wherein the movement of the touch surface by the second actuator assembly is less perceptible to detection by the object away from the point of maximum engagement; and
a controller operably connected with the first and second actuator assemblies,
the controller configured to synchronize oscillatory movement of the first and second actuator assemblies so that the touch surface moves in the one or more lateral directions and in the one or more angled directions that are obliquely or perpendicularly to the touch surface and modulate at least one of amplitude, phase and frequency of the lateral and angular movements; and
wherein the modulation of the lateral and angular movements are less perceptible to detection by the object away from a point of maximum engagement but wherein said modulation is in a tactilely perceptible range at the point of maximum engagement such that the touch surface varies in engagement with the object and imparts a tactilely perceptible continuous pushing force on the object that is in a lateral direction along the touch surface.

13. The touch interface device of claim 12 wherein the first actuator assembly oscillates the touch surface at a first frequency that is at least 20 kilo Hertz.

14. The touch interface device of claim 12 wherein the first actuator assembly oscillates the touch surface at a first frequency that is at least 30 kilo Hertz.

15. The touch interface device of claim 12 wherein the first frequency and the second frequency are substantially the same.

16. The touch interface device of claim 12 wherein the controller varies a direction of the imparted force by varying a phase relationship between a first oscillation in the one or more lateral directions and a second oscillation in the angled direction.

17. The touch interface device of claim 12 further comprising:
a first massive system associated with the first actuator assembly, the first massive system comprising at least one of a first mounting or a first reactive mass; and
a second massive system associated with the second actuator assembly, the second massive system comprising at least one of a second mounting or a second reactive mass; and
wherein the resonances of the first massive system and the second massive system are substantially the same.

18. The touch interface device of claim 12 wherein the surface is generally planar and the one or more lateral directions of the surface are substantially co-planar with the surface.

19. A tangible and non-transitory computer readable storage medium for a system that includes a processor, the non-transitory computer readable storage medium including one or more sets of instructions configured to direct the processor to:
control a first actuator assembly to move a touch surface in one or more lateral directions along the touch surface so as to engage an object at a point of maximum engagement,
wherein the first actuator assembly moves the generally planar surface in the one or more lateral directions periodically at a frequency wherein the movement of the touch screen by the first actuator is less perceptible to detection by the object away from the point of maximum engagement;
control a second actuator assembly to move at least a portion of the touch surface in one or more angled directions that are obliquely or perpendicularly angled to the touch surface to also engage the object at the point of maximum engagement,
wherein the second actuator assembly moves the generally planar surface periodically and wherein the movement of the touch screen by the second actuator is less perceptible to detection by the object away from the point of maximum engagement;
control and synchronize motion of the touch surface in the one or more lateral directions and in the one or more angled directions that are obliquely or perpendicularly to the touch surface including modulating at least one of amplitude, phase, and frequency of the angular and lateral movements; and
wherein the modulation of the angular and lateral movements are less perceptible to detection by the object away from the point of maximum engagement but wherein said modulation produces the tactilely perceptible continuous pushing force on the object in a lateral direction along the touch surface at the point of maximum engagement, wherein the force provides haptic output to an operator of a device that includes the touch surface.

20. The non-transitory computer readable storage medium of claim 19 wherein the motion in one or more lateral directions and motion in the one or more angled directions are performed at substantially the same frequency.

21. The non-transitory computer readable storage medium of claim 20 wherein a direction of the imparted force is varied by varying a phase relationship between the motion in one or more lateral directions and motion in the one or more angled directions.

22. The non-transitory computer readable storage medium of claim 19 wherein the processor is further configured to modulate a frictional force experienced by the object concurrently with the motion in the one or more angled directions.

23. The non-transitory computer readable storage medium of claim 22 wherein the frictional force is modulated by varying an electrostatic attraction between the object and the touch surface.

24. The non-transitory computer readable storage medium of claim 23 wherein the electrostatic attraction has a different amplitude at a plurality of points distributed about the touch surface, whereby a plurality of objects contacting the touch surface experience different imparted forces.

* * * * *